United States Patent
Dickinson (10) Patent No.: US 10,634,176 B2
(45) Date of Patent: Apr. 28, 2020

(54) SEALED FASTENER CLIP WITH ONE-STEP ASSEMBLY

(71) Applicant: Termax LLC, Lake Zurich, IL (US)

(72) Inventor: Daniel James Dickinson, Lincolnshire, IL (US)

(73) Assignee: TERMAX LLC, Lake Zurich, IL (US)

( * ) Notice: Subject to any disclaimer, the term of this patent is extended or adjusted under 35 U.S.C. 154(b) by 0 days.

(21) Appl. No.: 16/140,395

(22) Filed: Sep. 24, 2018

(65) Prior Publication Data

US 2019/0017527 A1  Jan. 17, 2019

Related U.S. Application Data

(60) Continuation-in-part of application No. 14/919,668, filed on Oct. 21, 2015, now Pat. No. 10,336,265, and a continuation-in-part of application No. 12/534,119, filed on Aug. 1, 2009, now Pat. No. 9,457,734, which is a continuation-in-part of application No. 11/870,412, filed on Oct. 10, 2007, now Pat. No. 8,950,042, which is a continuation-in-part of application No. 11/277,107, filed on Mar. 21, 2006, now Pat. No. 8,627,552, which is a continuation-in-part of application No. 10/906,209, filed on Feb. 9, 2005, now Pat. No. 7,178,850, which is a continuation-in-part of application No.
(Continued)

(51) Int. Cl.
| | |
|---|---|
| *B60R 13/02* | (2006.01) |
| *B60R 13/06* | (2006.01) |
| *F16B 2/24* | (2006.01) |
| *F16B 21/07* | (2006.01) |
| *F16B 5/06* | (2006.01) |

(52) U.S. Cl.
CPC .......... *F16B 5/0614* (2013.01); *F16B 21/075* (2013.01); *F16B 5/065* (2013.01); *Y10T 24/30* (2015.01); *Y10T 24/304* (2015.01); *Y10T 24/306* (2015.01); *Y10T 24/307* (2015.01); *Y10T 24/44026* (2015.01); *Y10T 24/4453* (2015.01); *Y10T 403/7176* (2015.01)

(58) Field of Classification Search
CPC ...... F16B 5/0614; F16B 21/075; Y10T 24/30; Y10T 24/304; Y10T 24/306; Y10T 24/307; Y10T 24/4453; Y10T 24/44026
See application file for complete search history.

(56) References Cited

U.S. PATENT DOCUMENTS

| | | | | |
|---|---|---|---|---|
| 2,499,637 | A | * | 3/1950 | Flora ........................ B22C 21/14 24/295 |
| 4,630,338 | A | * | 12/1986 | Osterland ............... F16B 5/123 24/293 |

(Continued)

*Primary Examiner* — Robert Sandy
*Assistant Examiner* — Michael S Lee (57) ABSTRACT

A system and method including a fastener clip assembly including a tub configured to engage and be secured to a slot in a chassis. The tub is configured to be secured to the slot bases at least upon the tub comprising two or more tabs. The tabs are attached to the tub along a top portion of each of the tabs, and each of the tabs are configured to bend along the top portion of the tabs. Each of the tabs are configured to bend in response to the tub being inserted into the slot and to bend back to original positions of each of the tabs. Bottom portions of each the tabs secure the tub to the slot.

10 Claims, 8 Drawing Sheets

Related U.S. Application Data

10/704,094, filed on Nov. 7, 2003, now abandoned, which is a division of application No. 10/164,963, filed on Jun. 7, 2002, now Pat. No. 6,718,599.

(60) Provisional application No. 62/561,679, filed on Sep. 22, 2017.

(56) References Cited

U.S. PATENT DOCUMENTS

| | | | | |
|---|---|---|---|---|
| 5,533,237 | A * | 7/1996 | Higgins | F16B 5/065 24/289 |
| 5,606,784 | A * | 3/1997 | Hamamoto | B60N 2/015 24/580.1 |
| 5,759,004 | A * | 6/1998 | Kuffel | F16B 21/086 24/295 |
| 6,141,837 | A * | 11/2000 | Wisniewski | F16B 5/0614 24/289 |
| 6,453,533 | B1 * | 9/2002 | Schutz | B21D 1/08 29/401.1 |
| 6,527,471 | B2 * | 3/2003 | Smith | F16B 2/20 24/293 |
| 6,629,809 | B2 * | 10/2003 | Vassiliou | F16B 37/02 411/173 |
| 2002/0050551 | A1 * | 5/2002 | Yamada | B60N 2/01508 248/500 |

* cited by examiner

SEALED FASTENER CLIP WITH ONE-STEP ASSEMBLY

A. BACKGROUND

The invention relates generally to devices for fastening objects, and more particularly to a fastener clip assembly for insertion into an engagement structure, such as a vehicle chassis, a hollow substrate, a wall, a plate, or any suitable surface.

A number of devices and fasteners are currently available for fastening panels, such as body panels and automobile interior trim piece panels, to the chassis of a vehicle. As used herein, a body panel refers to, for example, any interior or exterior body panel on a vehicle, a plastic interior trim piece, door panel, headliner or any interior trim piece. Additionally, the panel may be any suitable exterior body panel, such as a fender, bumper, quarter panel or door panel. The chassis of the vehicle may include any substrate, plate, body panel, structural framework, chassis component or subcomponent, wall, or any suitable object.

These conventional fastener devices provide approximately relatively equal levels of insertion and extraction force. These body panels often attach to the chassis of an automobile with a relatively high-level insertion force while providing a relatively low level of extraction force.

Fastener clips, such as two-piece fasteners (multi-piece), are known for attaching body panels to an automobile chassis. Two-piece fasteners are used so that if the panels are removed after original installation, such as to service the components in the door, they may be pulled apart so that one portion remains attached to the sheet metal while the other remains attached to the trim panel. The two pieces may also be reattached after separation. However, two-piece fasteners require manufacturing of multiple pieces and labor-intensive assembly of the two pieces and thus are relatively expensive.

One-piece fasteners are typically less expensive than two or multi piece fasteners. One-piece fasteners have a base to attach to a body panel and a post attached to the base and wings attached at least to the top of the post at a tip of the fastener for fastening to a frame slot. However, if the frame slot and the fastener are misaligned then the forces on the wings are unequal since the wing closest to the slot edge will experience higher wing compression while the other wing will have insufficient springing force to engage the slot. As the clip is forced into the slot, such high forces on one wing may cause the wing to break off thus rendering the fastener incapable of fastening the body panel to the frame. Worse, the broken, damaged, or weakened wing can cause detachment of the body panel or contribute to rattles.

The wings of conventional fasteners have a sharp, unsmooth groove to engage the edge of the frame slot. When the clip is removed however, the sharp edges of the frame slot cut into the softer plastic and cut the groove. During manufacture, the slots are typically formed in the frame of the vehicle, such as in an inner roof or door sheet metal structure, by punching the sheet metal. As the punch enters the sheet metal, the outer part of the sheet metal is pushed toward the inside and a metal puncture or ridge is formed on the inside of the sheet metal. The resulting slot edge on the outer part of the slot is relatively smooth; however, the inner part of the slot edge is sharp and rough. Upon removal of the fastener clip, the sharp edges of the frame cut off the groove so that the clip may not be reinserted and reusable.

If the slot is off-center or if the sheet metal varies in thickness or if tolerances in production of the slot in the vehicle chassis or in the trim-piece exist, for example, then engagement of one portion of the hole in the chassis with one of the wings may not provide suitable frictional engagement. Twisting of the body panel will be likely more prevalent because less than all contact points are actually made with the slot of the vehicle chassis. As a result, conventional single piece fasteners do not self-align themselves when the fastener and the body panel are misaligned and are prone to wing breakage such that the fastener cannot be re-attached.

Conventional fasteners typically do not adequately secure the panel to the vehicle chassis having variations in slot size and location or sheet metal with different curvature or thicknesses throughout. Conventional single piece fasteners do not self-align themselves when the fastener and the body panel are misaligned and are prone to wing breakage such that the fastener cannot be re-attached. Also, conventional fasteners are not suitable when subjected to a variety of environmental conditions, such as in the presence of vibration at various levels of amplitude and frequency. For example, conventional fasteners of this type typically do not prevent or minimize the amount of buzzing, rattling or any other type of noise that may cause attention to the occupants of the vehicle or otherwise weaken the attachment. Conventional fasteners do not adequately accommodate various levels of production tolerances, such as various dimensions amongst, for example, the body panels as well as the vehicle chassis. Thus, conventional fastener devices typically do not self-align nor adequately fasten to a range of sheet metal thicknesses and do not minimize or eliminate buzzing and rattling and do not sufficiently accommodate variations in production tolerances. As a result, wear, squeaks, rattles, buzzing, corrosion and loss of elasticity and loss of sealing may result, especially after years of vehicle operation and exposure to vibration, heat, humidity, and other environmental conditions.

B. BRIEF DESCRIPTION OF THE DRAWINGS

Other objects and advantages of the invention may become apparent upon reading the detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

C. DETAILED DESCRIPTION

Disclosed below are various concepts related to, and embodiments of, systems and methods for automatically detecting similarities between sensors in order to identify and match sensors of a similar nature and type.

Figure 1:
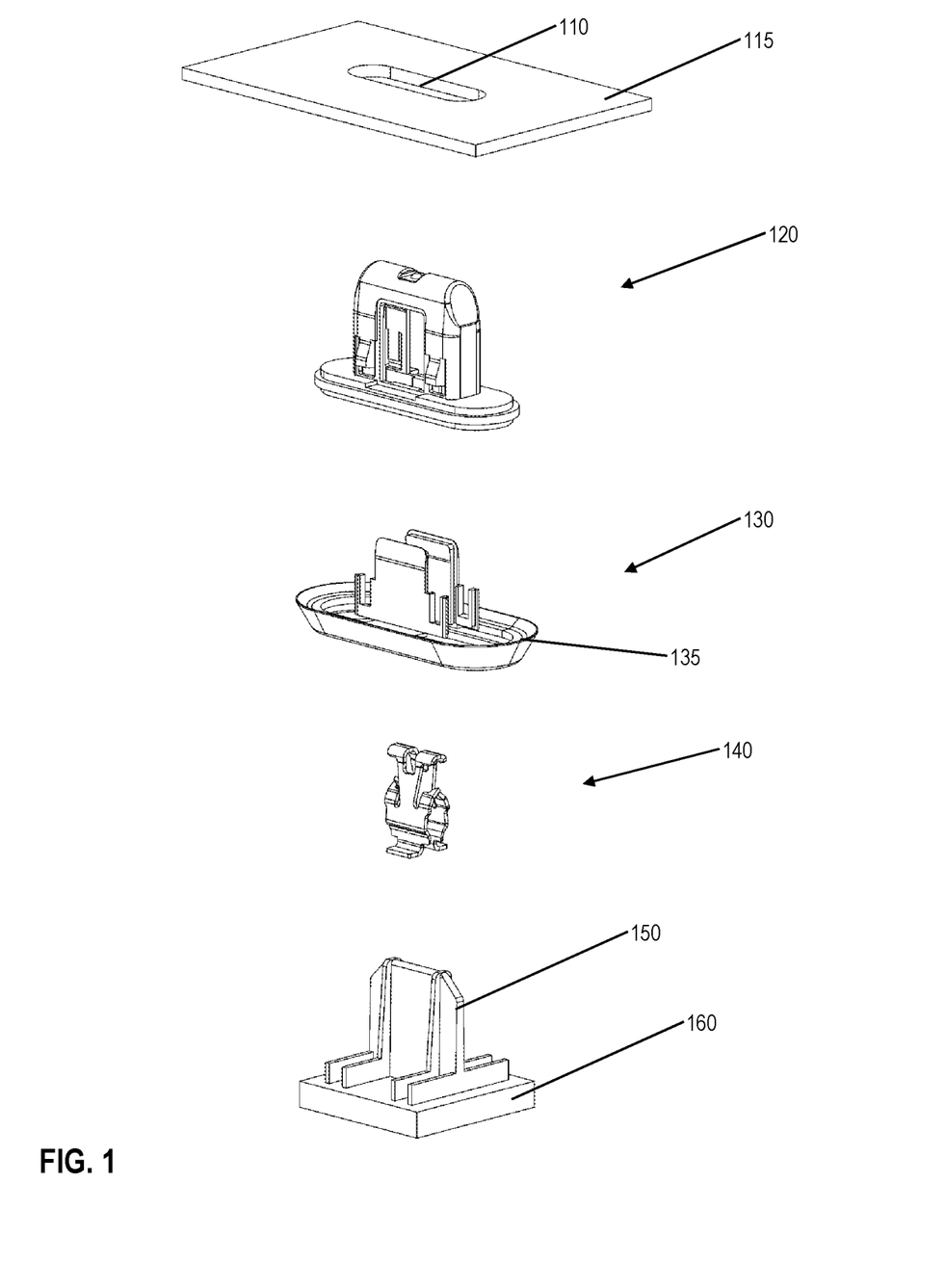
FIG. 1 is an exploded view of a fastener clip assembly, in accordance with some embodiments.

FIG. 1 is an exploded view of a fastener clip assembly, in accordance with some embodiments.

Figure 2:
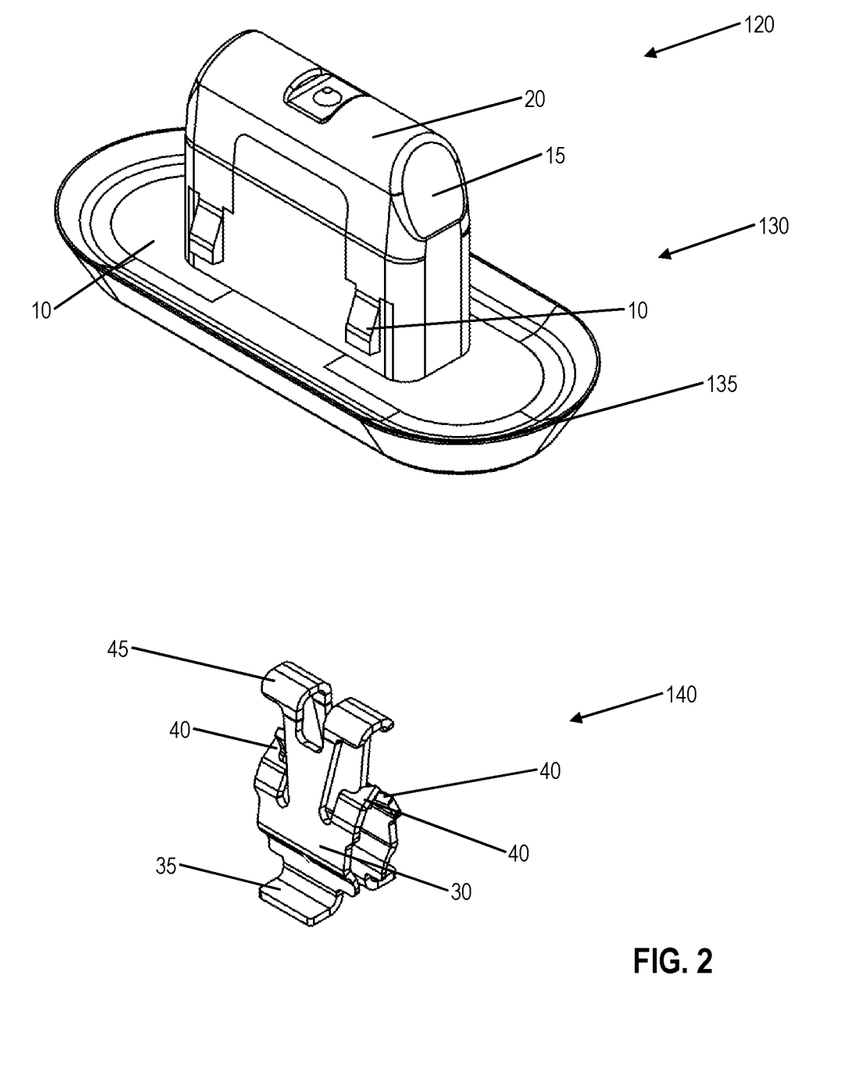
FIG. 2 is an alternative exploded view of a plastic tub and a metal clip of a fastener clip assembly, in accordance with some embodiments.

FIG. 2 is an alternative exploded view of a plastic tub and a metal clip of a fastener clip assembly, in accordance with some embodiments.

Figure 3:
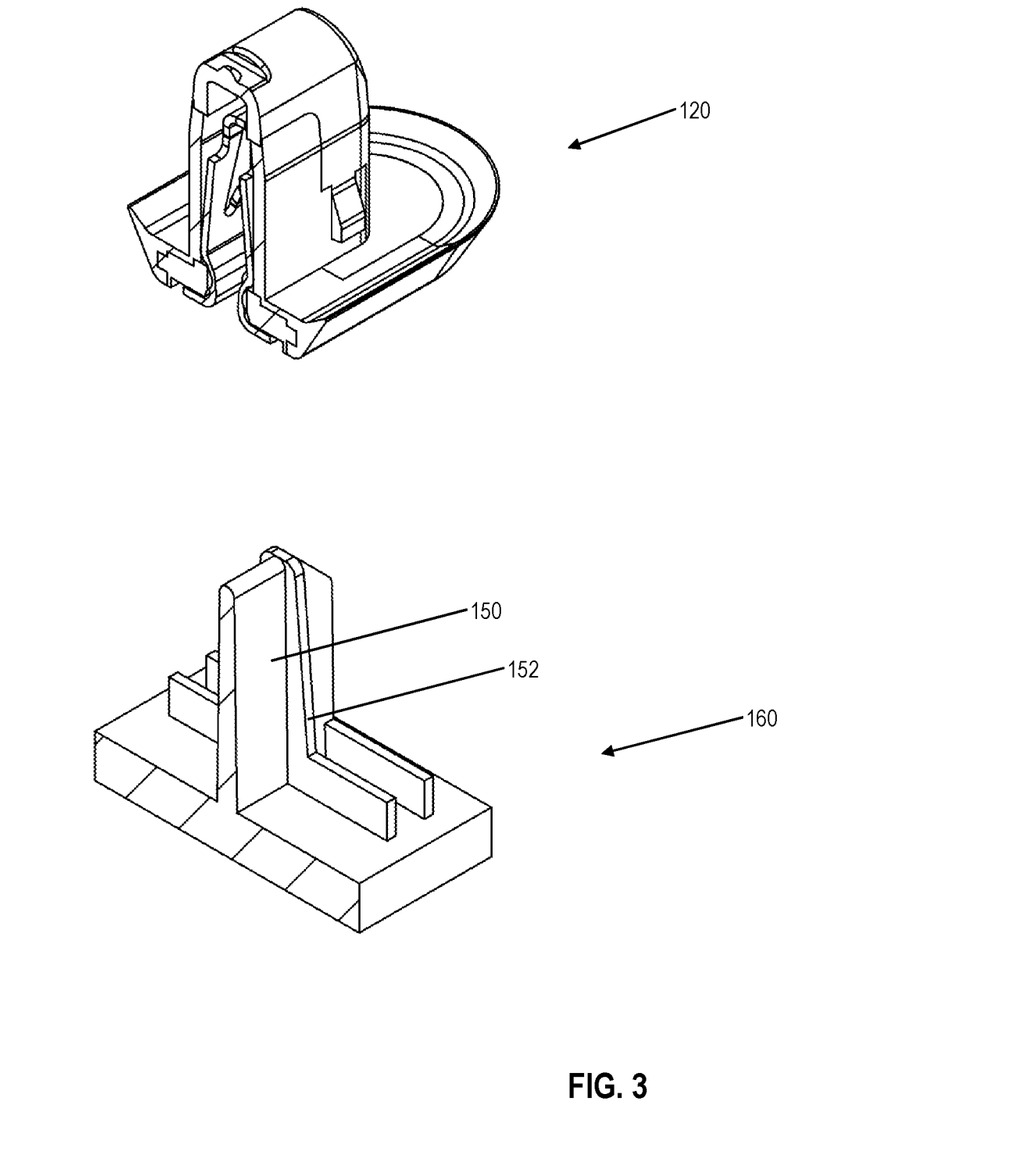
FIG. 3 is another alternative exploded cross-sectional view of a fastener clip assembly, in accordance with some embodiments.

FIG. 3 is another alternative exploded cross-sectional view of a fastener clip assembly, in accordance with some embodiments.

Figure 4:
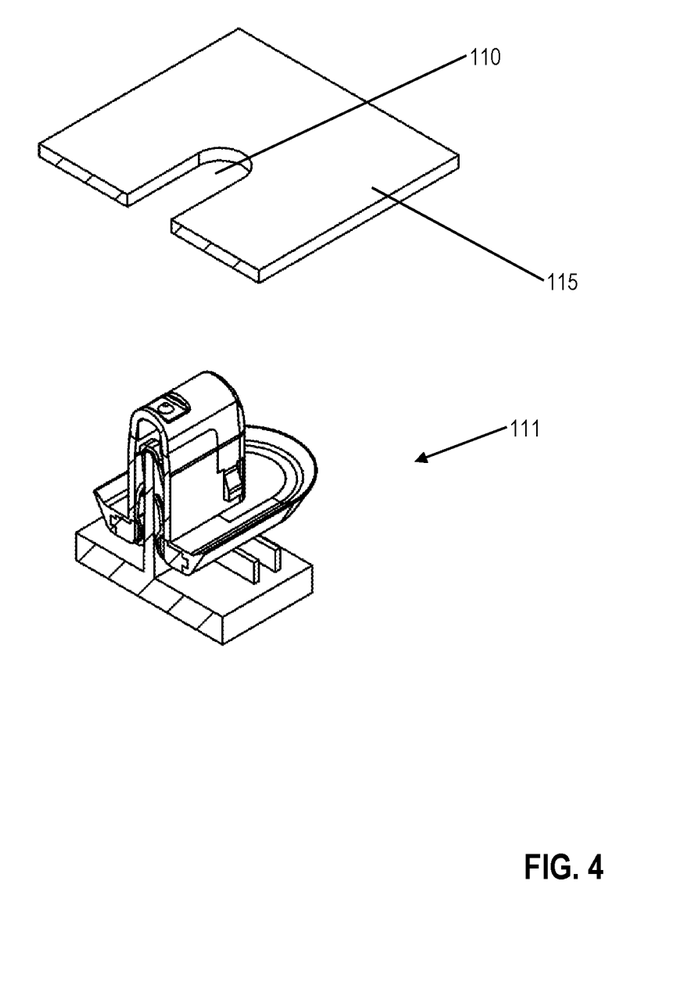
FIG. 4 is yet another alternative exploded cross-sectional view of a fastener clip assembly, in accordance with some embodiments.

FIG. 4 is yet another alternative exploded cross-sectional view of a fastener clip assembly, in accordance with some embodiments.

Figure 5:
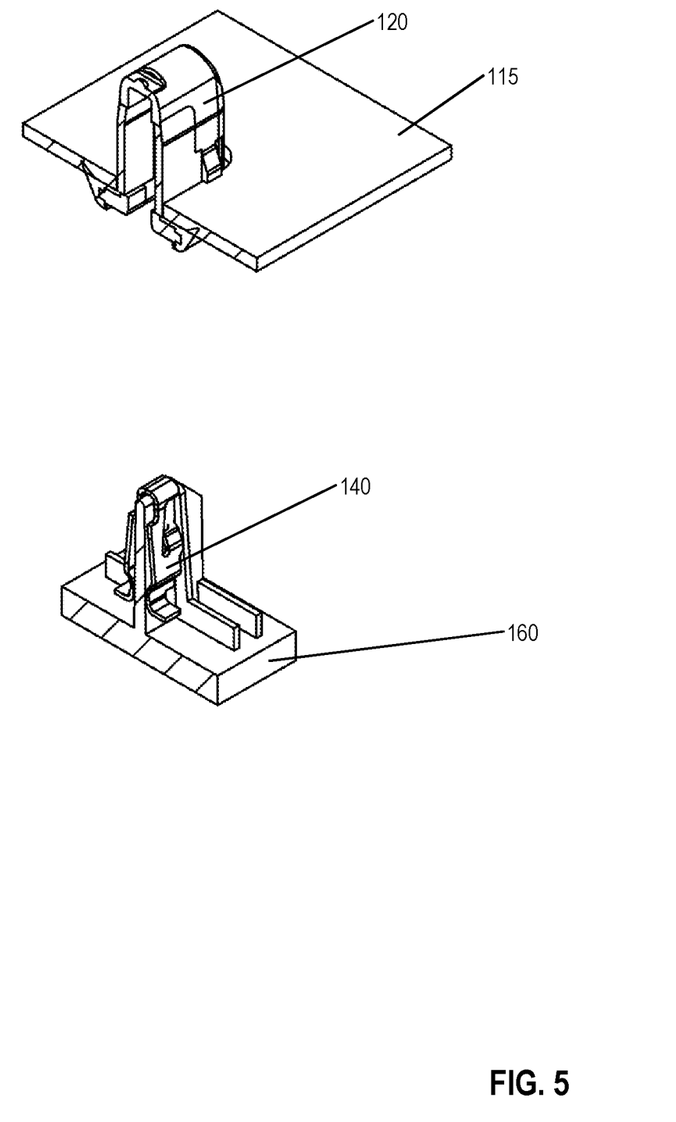
FIG. 5 is yet another alternative exploded cross-sectional view of a fastener clip assembly, in accordance with some embodiments.

FIG. 5 is yet another alternative exploded cross-sectional view of a fastener clip assembly, in accordance with some embodiments.

In some embodiments, the fastener clip assembly comprises tub 120, rubber layer 130 and metal clip 140.

In some embodiments, the assembly may be configured to retain various trim panels (such as panel 160, of which a rectangular portion is shown) to a car chassis (such as chassis 115, of which a rectangular portion is shown).

In some embodiments, rubber layer 130 may be manufactured, using an overmolding process, for example, over tub 120. Tub 120 may be molded out of plastic, for example. Rubber layer 130 may be then overmolded with rubber material over tub 120. In some embodiments, overmolding 130 is configured to create seals in openings in tub 120 while allowing portions of tub 120 to freely bend substantially unrestricted. For example, tub 120 may comprise tabs that are configured to bend in while tub 120/rubber layer 130 are inserted into slot 110 of chassis 115 and then bend back out at the end to secure the assembly to chassis 115. In addition, skirt 135 as well as other portions of overmolding 130 are also configured to form a seal against chassis 115.

Clip 140, which may be made of metal in some implementations, and may be configured to engage and removably be attached to the inside of tub 120. Clip 140 is also configured to be secured to rib/blade 150. Rib/blade 150 is attached or is a part of panel 160. In some embodiments, clip 140 is configured to form a non-removable coupling to rib 150.

In some embodiments, tub 120 and clip 140 are configured in dimensions to permit tabs in tub 120 to freely bend even after clip 140 has already been installed in tub 120. Accordingly, tub 120 with rubber layer 130 and clip 140 already engaged may be installed as an assembled group into slot 110 of chassis 115. Rib 150 may be then pushed into and engage with the assembly through clip 140 at a later time. One or more ridges, such as ridge 152 may be configured to guide clip 140 onto rib 150, and in addition, the ridges may provide additional structural support for rib 150.

Figure 6:
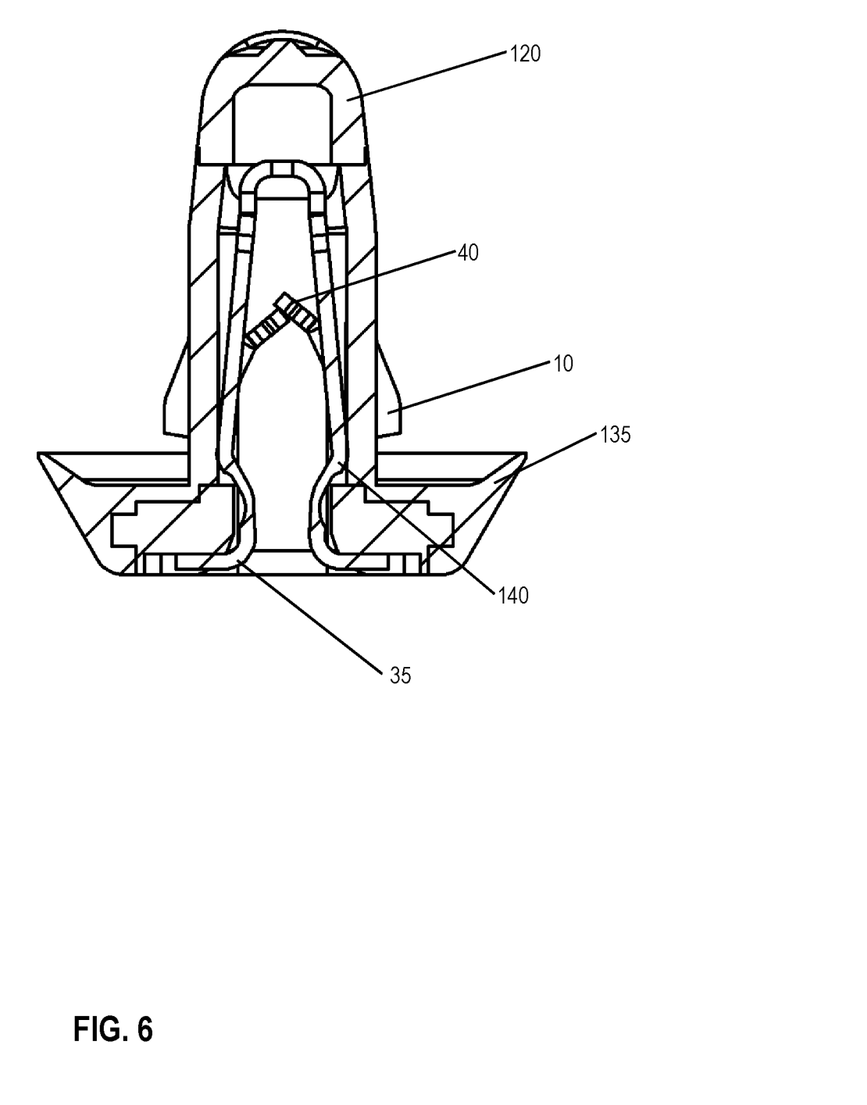
FIG. 6 is a side view of an assembled fastener clip assembly, in accordance with some embodiments.

FIG. 6 is a side view of an assembled fastener clip assembly, in accordance with some embodiments.

Figure 7:
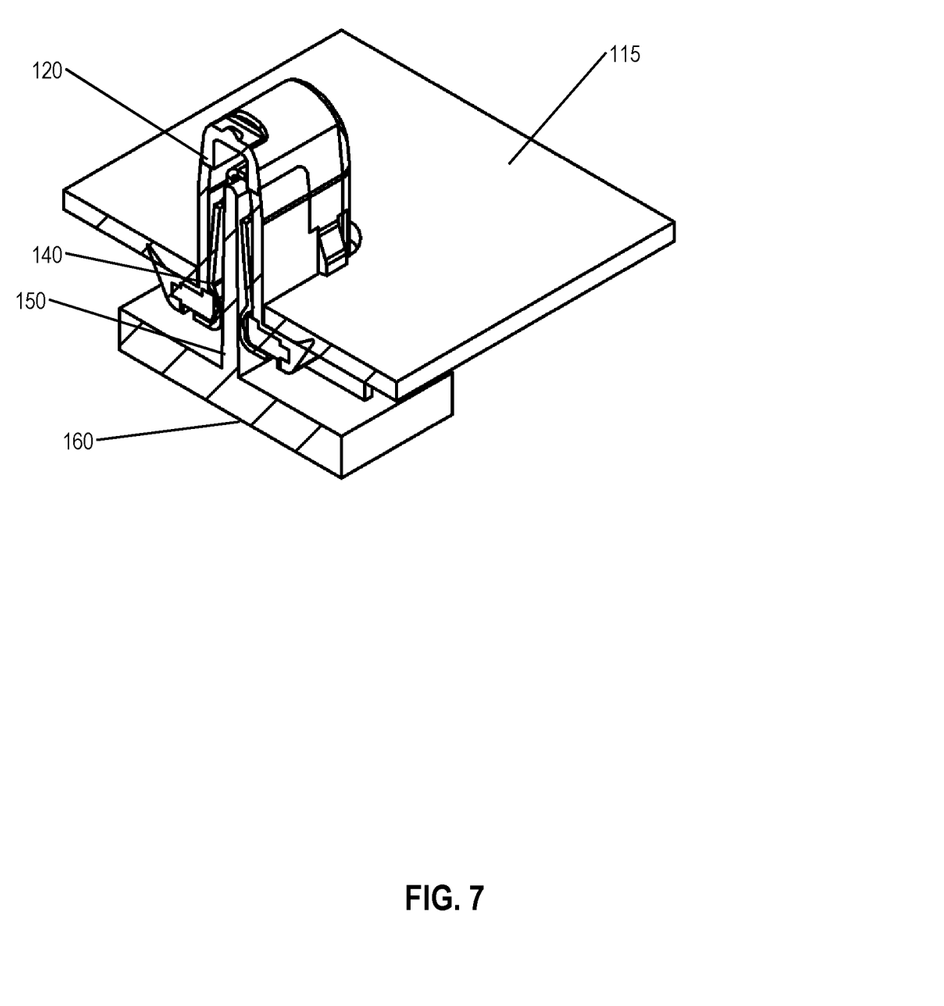
FIG. 7 is a cross-sectional view of an assembled fastener clip assembly, in accordance with some embodiments.

FIG. 7 is a cross-sectional view of an assembled fastener clip assembly, in accordance with some embodiments.

Figure 8:
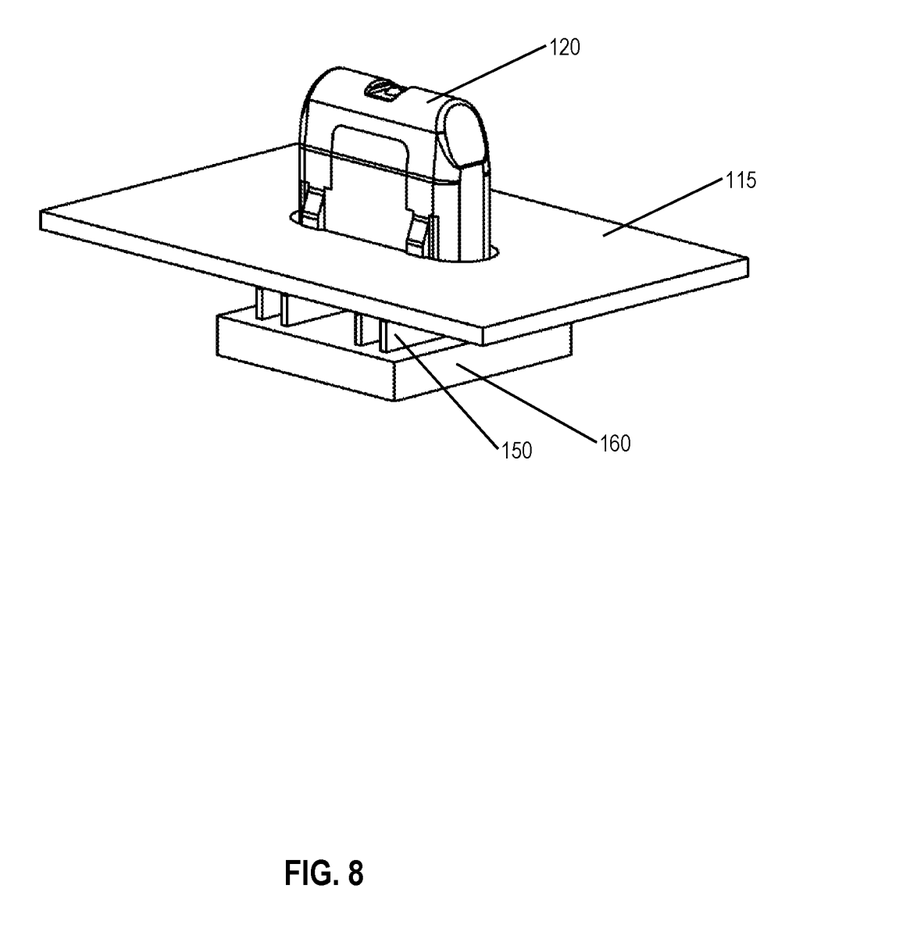
FIG. 8 is another view of an assembled fastener clip assembly, in accordance with some embodiments.

FIG. 8 is another view of an assembled fastener clip assembly, in accordance with some embodiments.

In some embodiments, tub 120 (together with its rubber layer 130) is configured to engage with and be attached to slot 110 in chassis 115, for example. Rubber layer 130 is configured to seal (from water, moisture, dust, etc.) openings in tub 120. In addition, skirt 135 of rubber layer 130 is configured to form a seal (again from water, moisture, dust, etc.) against chassis 115 when tub 120 engages slot 110.

In some embodiments, tub 120 comprises four tabs 10, which are configured to engage slot 110. In some embodiments, tabs 10 may be cut away from tub 120 in three sides (two sides and bottom) and remain attached to tub 120 at the top portion only. Accordingly, easier bending inwards and outwards of the tabs may be accomplished by having only one sided connected. Portions of rubber layer 130, may be formed around the gaps (sides and bottom) of tabs 10 forming a seal while still permitting the easy bending of tabs 10. A seal may prevent, for example, dirt from entering into the vehicle environment though the slot in the chassis.

Tabs 10 may have a gradually sloping top portion to facilitate easy engagement with the slot. In addition, tabs 10 may have a sharp (close to 90 degrees) bottom portion to ensure a secure connection to chassis 115. Tub 120 may also comprise tapered top portion 20 and tapered side portions 15 to help guide tub 120 into slot 110.

Clip 140 is configured to engage with and be removably secured to tub 120. In some embodiments, clip top 45 is configured to fit into a similarly formed portion inside the top of tub 120. Legs 30 are configured to bend inwards as the clip is pushed into tub 120 and then bend back outwards to facilitate a coupling between clip 140 and tub 120. Corresponding notches on either side of the inside of tub 120 are configured to further increase the coupling of clip 140 and tub 120.

Feet 35 on clip 140 are configured to rest in corresponding openings in tub 120 to facilitate secure coupling of clip 140 in tub 120, especially in situations where rib 150 has not yet been inserted into clip 140.

Clip 140 is also configured to engage with and be secured to rib 150 of panel 160. Hooks (four of them, in some embodiments) 40 of clip 140 are configured to have a slight angle inward and to be facing up in such a way that the hooks are in the way of rib 150. Accordingly, in some embodiments, hooks 40 are configured to substantially permanently attach clip 140 to tub 120.

In some embodiments, rib 150 may comprise one or more ridges that are configured to add strength to the rib, and in addition, the ridges are configured to guide the rib into clip 140 for engagement.

After complete assembly of the clip parts to the chassis and to the panel, in some embodiments, panel 160 is attached to chassis 115. In some embodiments, the panel may be removed from the chassis by pulling the two apart. In such embodiments, clip 140 is configured to remain on rib 150 but removably separate from tub 120, which remains attached to slot 110. In some embodiments, clip 140 is configured to engage and disengage from tub 120 multiple times.

In some embodiments, tub 120, rubber layer 130, and clip 140 are configured to be assembled together first and then be placed into slot 110. A panel may be then pushed into the assembly and engage with clip 140 via rib 150 of the panel. After the first engagement, the panel may be then removed and reinserted multiple times by disengaging clip 140 and re-engaging it from tub 120.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

One or more embodiments of the invention are described above. It should be noted that these and any other embodiments are exemplary and are intended to be illustrative of the invention rather than limiting. While the invention is widely applicable to various types of systems, a skilled person will recognize that it is impossible to include all of the possible embodiments and contexts of the invention in this disclosure. Upon reading this disclosure, many alternative embodiments of the present invention will be apparent to persons of ordinary skill in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. Accordingly, a system, method, or other embodiment that comprises a set of elements is not limited to only those elements and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A fastener clip assembly comprising:
   a tub configured to engage and be secured to a slot in a chassis, wherein the tub is configured to be secured to the slot based at least upon the tub comprising two or more tabs,
      wherein the tabs are attached to the tub along a top portion of each of the tabs and wherein the tabs are configured to bend along the top portion of the tabs,
      wherein the tabs are configured to bend in response to the tub being inserted into the slot and to then bend back to original positions of the tabs, wherein bottom portions of the tabs engage the chassis to secure the tub to the slot; and
   a rubber layer on the inside of the tub, wherein the rubber layer is configured to create a seal of openings around the tabs of the tub.

2. The fastener clip assembly of claim 1, wherein the rubber layer extends around the outside of the tub, forming a skirt configured to create a seal against the chassis and around the slot in the chassis.

3. The fastener clip assembly of claim 1, further comprising a clip,
   wherein the clip is configured to attach to a rib on a panel based at least upon the clip comprising one or more barbs that are configured to dig into the rib as the clip is being inserted on top of the rib, wherein the barbs are located on the inside of the clip and are pointing up,
   wherein the clip is configured to engage and attach to an inside of the tub based at least upon the clip comprising legs that are configured to engage the inside of the tub.

4. The fastener clip assembly of claim 3, wherein the tub with the rubber layer is configured to be permanently attached into the slot in the chassis and wherein the clip is configured to be permanently attached on the rib of the panel.

5. The fastener clip assembly of claim 3, wherein the rib comprises one or more ridges that are configured to add rigidity to the rib, and wherein the ridges are configured to guide the clip onto the rib.

6. A fastener clip assembly comprising:
   a chassis;
   a tub configured to engage and be secured to a slot in the chassis,
      wherein the tub is configured to be secured to the slot based at least upon the tub comprising two or more tabs,
      wherein the tabs are attached to the tub along a top portion of each of the tabs and wherein the tabs are configured to bend along the top portion of the tabs,
      wherein the tabs are configured to bend in response to the tub being inserted into the slot and to then bend back to original positions of the tabs, wherein bottom portions of the tabs engage the chassis to secure the tub to the slot; and
   a rubber layer on the inside of the tub, wherein the rubber layer is configured to create a seal of openings around the tabs of the tub.

7. The fastener clip assembly of claim 6, wherein the rubber layer extends around the outside of the tub, forming a skirt configured to create a seal against the chassis and around the slot in the chassis.

8. The fastener clip assembly of claim 6, further comprising a clip and a panel,
   wherein the clip is configured to attach to a rib on the panel based at least upon the clip comprising one or more barbs that are configured to dig into the rib as the clip is being inserted on top of the rib, wherein the barbs are located on the inside of the clip and are pointing up,
   wherein the clip is configured to engage and attach to an inside of the tub based at least upon the clip comprising legs that are configured to engage the inside of the tub.

9. The fastener clip assembly of claim 8, wherein the tub with the rubber layer is configured to be permanently attached into the slot in the chassis and wherein the clip is configured to be permanently attached on the rib of the panel.

10. The fastener clip assembly of claim 8, wherein the rib comprises one or more ridges that are configured to add rigidity to the rib, and wherein the ridges are configured to guide the clip onto the rib.

* * * * *